3,088,862
Patented May 7, 1963

3,088,862
THIURAM DISULFIDE NEMATOCIDES
Horst Werres, Berlin-Charlottenburg, and Ernst-Albrecht Pieroh, Berlin-Frohnau, Germany, assignors to Schering A.G., Berlin, Germany, a corporation of Germany
No Drawing. Filed Sept. 30, 1958, Ser. No. 764,217
Claims priority, application Germany Mar. 26, 1958
14 Claims. (Cl. 167—22)

This invention relates to novel preparations for the destruction of nematodes. More particularly, the invention concerns nematodicides comprising thiuram disulfides and the method of applying such nematodicides.

In accordance with the present invention, it has been found that thiuram disulfides having the general formula

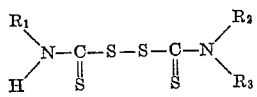

wherein $R_1$, $R_2$, $R_3$ are H, alkyl, aryl or aralkyl groups can be used with particular success for combatting nematodes. As examples of substituents there may be mentioned methyl, ethyl, propyl, phenyl, benzyl and others. These compounds may be used against nematodes either singly or several differently substituted thiuram disulfides may be used effectively in combination.

There have already been suggested for nematodicidal purposes a variety of compounds, including for example, sodium N-methyldithiocarbamate (Vapam), and 1,2-dibromo-3-chloropropane (Nemagon). However, the novel nematodicides of the present invention exhibit greatly increased efficacy compared with known nematodicides.

It was not predictable that the above mentioned compounds would prove to be specially well suited for the destruction of nematodes, since it was known that the tetraalkyl derivatives, such as tetramethyl thiuram disulfide, were practically devoid of effectiveness against nematodes.

The preparation of thiuram disulfides may be carried out in accordance with known methods, for example, by the oxidation of dithiocarbamic acid salts with ferric chloride or sodium tetrathionate.

The novel nematodicidal agents of this invention may be applied in any desired form. For example, they may be dissolved in suitable organic solvents and applied in the form of solutions. Suitable solvents include, for example, the chlorinated hydrocarbons, such as methylene chloride, carbon tetrachloride, and the like. The nematodicidal agents may also be prepared in combination with solid inert carriers, such as, for example, kaolin, or activated clay (Tonsil), and applied in the form of dusting preparations.

The outstanding effectiveness of the nematodicidal agents of this invention may be seen from the following examples. These examples are to be considered as illustrative and not as limiting.

EXAMPLE 1

*N,N'-Dimethyl Thiuram Disulfide*

(A) Tests of the nematodicidal effectiveness of the pure compound were run against (a) *Aphelenchoides ritzemabosi* (leaf nematode) (Schwartz), and (b) *Ditylenchus dipsaci* (Kuehn). The tests were made by treating liter of infested soil with applications, respectively, corresponding to 20, 15 and 10 mg. of the pure compound. Relative soil humidity was 20%, temperature was 19° to 20° C. Evaluation was made after 20 hours. The nematodicide was applied in the form of a solution in methylene chloride. The results obtained are shown in the following table in which 100 denotes 100% inactivation of the larvae, while 0 denotes 0% inactivation:

| Amount Applied | (a), percent | (b), percent |
|---|---|---|
| 20 mg. active substance per liter of soil | 100 | 100 |
| 15 mg. active substance per liter of soil | 95 | 95 |
| 10 mg. active substance per liter of soil | 90 | 90 |

In contrast thereto the following values were obtained with sodium N-methyldithiocarbamate in aqueous solution:

| Amount Applied | (a), percent | (b), percent |
|---|---|---|
| 20 mg. active substance per liter of soil | 100 | 100 |
| 15 mg. active substance per liter of soil | 70 | 60 |
| 10 mg. active substance per liter of soil | 50 | 30 |

(B) *Greenhouse test.*—N,N'-dimethyl thiuram disulfide in the form of a 20% dusting preparation was mixed with soil which was infested with the rootknot nematode, *Meloidogyne* spp. The relative humidity was 17%; the soil temperature during a 10-day idle period was 15° C. In the thus-treated soil tomatoes were planted and after a culture period of 30 days the tomato roots were investigated for occurrence of nematodes. The effectiveness of the preparation in terms of amounts of active substance present and degree of nematodicidal action are shown in the following table.

Amount applied:          Nematodicidal action, percent
80 mg. active substance per liter of soil_____ 100
60 mg. active substance per liter of soil_____ 93

By way of comparison a corresponding preparation of sodium N-methyldithiocarbamate gave the following values.

Amount applied:          Nematodicidal action, percent
80 mg. active substance per liter of soil_____ 95
60 mg. active substance per liter of soil_____ 77

(C) In using a 20% dusting preparation of N,N'-dimethyl thiuram disulfide for the deinfestation of soil from phytopathogenic nematodes, a uniform distribution of the preparation in the soil is not required. 100 gr. per square meter of the 20% preparation were worked into soil to a depth of 10 cm., and produced a 100% kill of rootknot nematodes down to a depth of 20 cm.

(D) When 150 gr. per square meter of a 20% dusting preparation of N,N'-dimethyl thiuram disulfide was worked to a depth of 20 cm. into soil infested with the potato nematode, *Heterodera rostochiensis*, there was achieved a 100% kill of the cystenin content.

EXAMPLE 2

*N,N'-Diethyl Thiuram Disulfide*

Using the same test nematodes (a) and (b) indicated in Example 1, tests of the pure compound in solution in methylene chloride were run under the same general conditions specified in the preceding example. The results in terms of the amount of active compound applied and inactivation of the larvae are shown in the following table:

| Amount Applied | (a), percent | (b), percent |
|---|---|---|
| 40 mg. active substance per liter of soil | 100 | 100 |
| 30 mg. active substance per liter of soil | 100 | 100 |
| 20 mg. active substance per liter of soil | 100 | 100 |
| 10 mg. active substance per liter of soil | 50 | 50 |

By comparison, tetramethyl thiuram disulfide exhibits only a slight activity when applied in solution in methylene chloride to the same soil, as shown in the following table:

| Amount Applied | (a), percent | (b), percent |
|---|---|---|
| 40 mg. active substance per liter of soil | 50 | 50 |
| 30 mg. active substance per liter of soil | 30 | 0 |
| 20 mg. active substance per liter of soil | 0 | 0 |
| 10 mg. active substance per liter of soil | 0 | 0 |

EXAMPLE 3

N,N'-Dibenzyl Thiuram Disulfide

Tests of the nematodicidal effectiveness of the active compound in the form of suspensions in water were run against (a) Aphelenchoides ritzemabosi (leaf nematode) (Schwartz), (b) Ditylenchus dipsaci (Kuehn) and (c) Meloidogyne spp. The tests were made by bringing the nematodes in the suspensions which contained the active compound in concentration of 0.1, 0.05, 0.01 and 0.005%. Evaluation was made after 20 hours temperature was 20° C. The results obtained are shown in the following table in which 100 denotes 100% inactivation of the larvae, while 0 denotes 0% inactivation.

| Concentration | (a), percent | (b), percent | (c), percent |
|---|---|---|---|
| 0.1% | 100 | 100 | 100 |
| 0.05% | 100 | 100 | 100 |
| 0.01% | 100 | 100 | 100 |
| 0.005% | 100 | 70 | 100 |

EXAMPLE 4

N,N,N'-Trimethyl Thiuram Disulfide

The tests were made in analogous manner as shown in Example 3.

The following results are obtained:

| Concentration | (a), percent | | (b), percent | | (c), percent | |
|---|---|---|---|---|---|---|
| | 1 day | 2 day | 1 day | 2 day | 1 day | 2 day |
| 0.1% | 100 | 100 | 100 | 100 | 100 | 100 |
| 0.05% | 100 | 100 | 100 | 100 | 100 | 100 |
| 0.01% | 100 | 100 | 90 | 100 | 100 | 100 |
| 0.005% | 70 | 70 | 30 | 50 | 70 | 95 |

EXAMPLE 5

N-Monomethyl Thiuram Disulfide

The tests were made in analogous manner as shown in Example 3.

The following results are obtained:

| Concentration | (a), percent | | (b), percent | | (c), percent | |
|---|---|---|---|---|---|---|
| | 1 day | 2 day | 1 day | 2 day | 1 day | 2 day |
| 0.1% | 100 | 100 | 100 | 100 | 100 | 100 |
| 0.05% | 100 | 100 | 100 | 100 | 100 | 100 |
| 0.01% | 70 | 70 | 70 | 70 | 70 | 70 |
| 0.005% | 50 | 50 | 30 | 50 | 50 | 50 |

We claim:

1. Method for disinfecting soil to destroy nematodes which comprises mixing soil in a concentration toxic to nematodes with at least one compound having the general formula

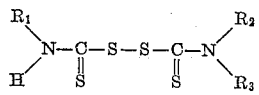

wherein $R_1$, $R_2$, and $R_3$ are substituents selected from the group consisting of H, lower alkyl, phenyl, and benzyl in solution in an organic solvent.

2. The method of claim 1 in which the solvent is methylene chloride.

3. The method of claim 1 in which $R_1$ and $R_2$ are methyl, $R_3$ is H.

4. The method of claim 1 in which $R_1$ and $R_2$ are ethyl, $R_3$ is H.

5. The method of claim 1 in which $R_1$, $R_2$ and $R_3$ are methyl.

6. The method of claim 1 in which $R_1$ is methyl, $R_2$ and $R_3$ are H.

7. Method for the destruction of nematodes which comprises mixing a soil infested with nematodes in a concentration toxic to said nematodes with a dusting composition which comprises at least one thiuram disulfide having the general formula

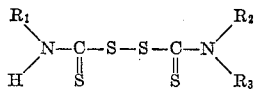

wherein $R_1$, $R_2$, and $R_3$ are substituents selected from the group consisting of H, lower alkyl, phenyl, and benzyl, in association with an inert carrier therefor.

8. The composition of claim 7 in which $R_1$ and $R_2$ are methyl, $R_3$ is H.

9. The composition of claim 7 in which $R_1$ and $R_2$ are ethyl, $R_3$ is H.

10. The composition of claim 7 in which $R_1$, $R_2$ and $R_3$ are methyl.

11. The composition of claim 7 in which $R_1$ is methyl, $R_2$ and $R_3$ are H.

12. Method for disinfecting soil to destroy nematodes which comprises impregnating soil in a concentration toxic to nematodes with the compound

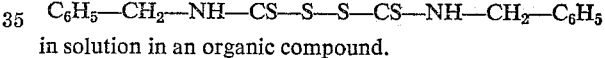

in solution in an organic compound.

13. Method for disinfecting soil to destroy nematodes which comprises treating soil in a concentration toxic to nematodes with a dusting composition which comprises the thiuram disulfide having the formula

14. Method for disinfecting soil to destroy nematodes which comprises mixing soil infested with nematodes with a nematocidal amount of a compound of the formula

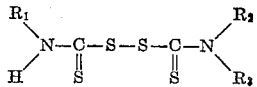

wherein $R_1$, $R_2$, and $R_3$ are substituents selected from the group consisting of H, lower alkyl, phenyl, and benzyl.

References Cited in the file of this patent

UNITED STATES PATENTS

| 1,945,517 | Bousquet | Apr. 10, 1934 |
|---|---|---|
| 1,972,961 | Tisdale | Sept. 11, 1934 |
| 1,982,909 | Flint | Dec. 4, 1934 |
| 2,014,353 | Cramer | Sept. 10, 1935 |
| 2,205,232 | Tisdale | June 18, 1940 |
| 2,333,084 | Flenner | Nov. 2, 1943 |
| 2,377,446 | Payne | June 5, 1945 |
| 2,415,251 | Leavitt | Feb. 4, 1947 |
| 2,448,265 | Kagy | Aug. 31, 1948 |
| 2,502,244 | Carter | Mar. 28, 1950 |
| 2,543,580 | Kay | Feb. 27, 1951 |
| 2,677,698 | Deutschman | May 4, 1954 |
| 2,726,485 | Thomas | Dec. 13, 1955 |
| 2,730,547 | Dye | Jan. 10, 1956 |
| 2,770,638 | Giolito | Nov. 13, 1956 |
| 2,779,680 | Wolf | Jan. 29, 1957 |
| 2,794,727 | Barrons | June 4, 1957 |
| 2,802,021 | Heininger | Aug. 6, 1957 |
| 2,802,818 | Wheeler | Aug. 13, 1957 |

(Other references on following page)

UNITED STATES PATENTS

| | | | |
|---|---|---|---|
| 2,802,831 | Wheeler | Aug. 13, | 1957 |
| 2,809,983 | Heininger | Oct. 15, | 1957 |
| 2,854,467 | Harmon | Sept. 30, | 1958 |
| 3,007,843 | Luckenbaugh | Nov. 7, | 1961 |

FOREIGN PATENTS

| | | | |
|---|---|---|---|
| 562,009 | Great Britain | June 14, | 1944 |
| 714,483 | Germany | Dec. 1, | 1941 |
| 742,185 | Germany | May 12, | 1943 |

OTHER REFERENCES

Eaton: Annals of Applied Biology, vol. 37, pp. 471–489.

Parnell: Brit. J. Pharmacol. (1952), vol. 7, pp. 509–533.

Roark: U.S. Dept. Agr. Bull. No. E–344, May 1935, p. 7.

Vivian: U.S. Dept. Agr. Bull. No. E–539, April 1941, p. 10.

Agr. and Food Chemisty, vol. 5, No. 3, March 1957, p. 160.